United States Patent [19]

Deglin et al.

[11] 4,237,545
[45] Dec. 2, 1980

[54] PROGRAMMABLE SEQUENTIAL LOGIC

[75] Inventors: Rene' Deglin, Velizy-Villacoublay; Gilbert Reymond, Malakoff, both of France

[73] Assignee: Compagnie Industrielle des Telecommunications Cit-Alcatel S.A., Paris, France

[21] Appl. No.: 973,774

[22] Filed: Dec. 27, 1978

Related U.S. Application Data

[63] Continuation of Ser. No. 780,393, Mar. 23, 1977, abandoned.

[30] Foreign Application Priority Data

Mar. 31, 1976 [FR] France .................. 76 09391

[51] Int. Cl.³ .............................................. G06F 9/06
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,210,733 | 10/1965 | Terzian et al. | 364/900 |
| 3,340,513 | 9/1967 | Kinzie et al. | 364/200 |
| 3,430,202 | 2/1969 | Downing et al. | 364/200 |
| 3,657,705 | 4/1972 | Mekota, Jr. et al. | 364/200 |

Primary Examiner—Harvey E. Springborn
Attorney, Agent, or Firm—Sughrue, Rothwell, Mion, Zinn and Macpeak

[57] ABSTRACT

A programmable sequential logic circuit processes data according to a program containing instructions of different lengths, each instruction composed of one or several words. The sequential logic circuit comprises a memory containing the instructions and data words, an arithmetic and logical processing unit (ALU), and an instruction register for temporarily storing an instruction word read from the memory. An adder is connected to index the contents of address registers by adding the contents of one of a plurality of data registers. A system clock circuit driven by a clock and an operation code in the instruction register to control the operation of the sequential logic circuit. Access to the ALU is through an input multiplexer inputs of which are connected to the output of the memory and the outputs of the data registers and of the address registers. The output of the ALU is connected to an output bus via a circuit having outputs which adopt a high impedance state when they are not enabled. The output bus is also connected to the inputs of the memory and of the data registers. Complete processing of an instruction according to the instruction word temporarily stored in the instruction register is performed in a plurality of phases under the control of the system clock circuit. A first portion of the plurality of phases is devoted to acquisition of one or several data or instruction words, and the second portion is devoted to the execution of an operation by the ALU according to the operation code maintained in the instruction word stored in the instruction register.

6 Claims, 2 Drawing Figures

PROGRAMMABLE SEQUENTIAL LOGIC

This is a continuation application of Ser. No. 780,393 filed Mar. 23, 1977, now abandoned.

BACKGROUND OF THE INVENTION

This invention relates to a programmable sequential logic circuit composed of an assembly of logic circuits associated with a memory. It may be used in any industry for the control of electronic or electromagnetic apparatus, and is particularly applicable to telecommunications.

The purpose of the invention is the provision of computer interfacing logic, particularly for computer controlled automatic switching centers (exchanges). In the current state of the art, computer control of exchanges may be devised in several forms: either a large computer (central processor) executes all tasks through various programmed or wired logic peripherals of low logic capability but high data handling capability, or else a set of minicomputers carry out assigned portions of the tasks and are under the overall control of a central computer.

Decentralization of functions is finding increasing acceptance, owing to the flexibility it procures and its freeing of the central computer from routine work.

However, the use of peripherals endowed with logic has certain disadvantages: (a) the creation of equipment precisely suited to desired functions leads to excessive diversity, whereas the use of production-run minicomputers is expensive, in that not all the capabilities of these devices are put to use, and (b) especially if it is desired to remove as many logic functions as possible from the switching network itself, the number of minicomputers required becomes rather large.

SUMMARY OF THE INVENTION

The programmable sequential logic circuit according to this invention is capable of carrying out any logic function relating to the connection of a central computer to a totally passive switching network, said logic circuit being programmed as appropriate for each desired use, such as logic of access to computer input/output busses, logic of switching network connection point control, logic of line equipment and register supervision.

Being of the sequential type, the logic circuit of this invention is organized around an arithmetic and logical processing unit (ALU) associated with a set of registers and a memory. The arithmetic and logic unit, of known type, operates on two source operands, which may be register contents, logic inputs, or memory words, and transfers results to a destination, such as a register, group of outputs, or memory location.

Operand and destination addresses and the operation code are contained in an instruction lodged in the logic's memory.

The invention is of particular interest, by reason of its operational flexibility: firstly the registers and memory may be successively or simultaneously sources and destinations for a large variety of operations. This is possible, in particular because of the use of "ternary" or tristate logic circuits, i.e. circuits with outputs that may present a third, high impedance condition, facilitating the use of bus wires throughout the circuit, secondly many complementary operations, such as tests, may be performed in a very short time, much shorter than the average time occupied by an instruction. In particular, any operation that is not in itself a test, can be combined with a result test.

The invention provides a programmable sequential logic circuit for processing data according to a program containing instructions of different lengths, each instruction composed of one or several words. The sequential logic circuit comprises a memory containing the instructions and data words, an arithmetic and logical processing unit (ALU), and an instruction register for temporarily storing an instruction word read from the memory. An adder is connected to index the contents of address registers by adding the contents of one of a plurality of data registers. A system clock circuit driven by a clock and an operation code in the instruction register to control the operation of the sequential logic circuit. Access to the ALU is through an input multiplexer inputs of which are connected to the output of the memory and the outputs of the data registers and of the address registers. The output of the ALU is connected to an output bus via a circuit having outputs which adopt a high impedance state when they are not enabled. The output bus is also connected to the inputs of the memory and of the data registers. Complete processing of the instruction according to the instruction word temporarily stored in the instruction register is performed in a plurality of phases under the control of the system clock circuit. A first portion of the plurality of phases is devoted to acquisition of one or several data or instruction words, and the second portion is devoted to the execution of an operation by the ALU according to an operation code contained in the instruction word stored in the instruction register.

Features of the invention are (a) that access to the ALU is through a multiplexer which makes it possible to connect in turn a first data source with an input ALU register connected to a first ALU data input, and then a second data source with a second ALU data input, the multiplexer being initialized according to a code in the instruction register, and (b) that the output data of the ALU is transferred to a destination on a bus connected in parallel to the input of each possible destination, the output of the ALU being connected to the bus by a logic circuit the outputs of which present a high impedance when not enabled.

BRIEF DESCRIPTION OF THE DRAWINGS

A preferred embodiment of the invention is described by way of example, with reference to the accompanying drawings, in which.

DESCRIPTION OF THE PREFERRED EMBODIMENT

The example chosen is that of the sequential logic built up from TTL circuits, equipped with a direct access, modular memory, and designed to carry out all the logic functions required for the interconnection of a controlling minicomputer with a passive switching network of an automatic exchange.

Figure 1:
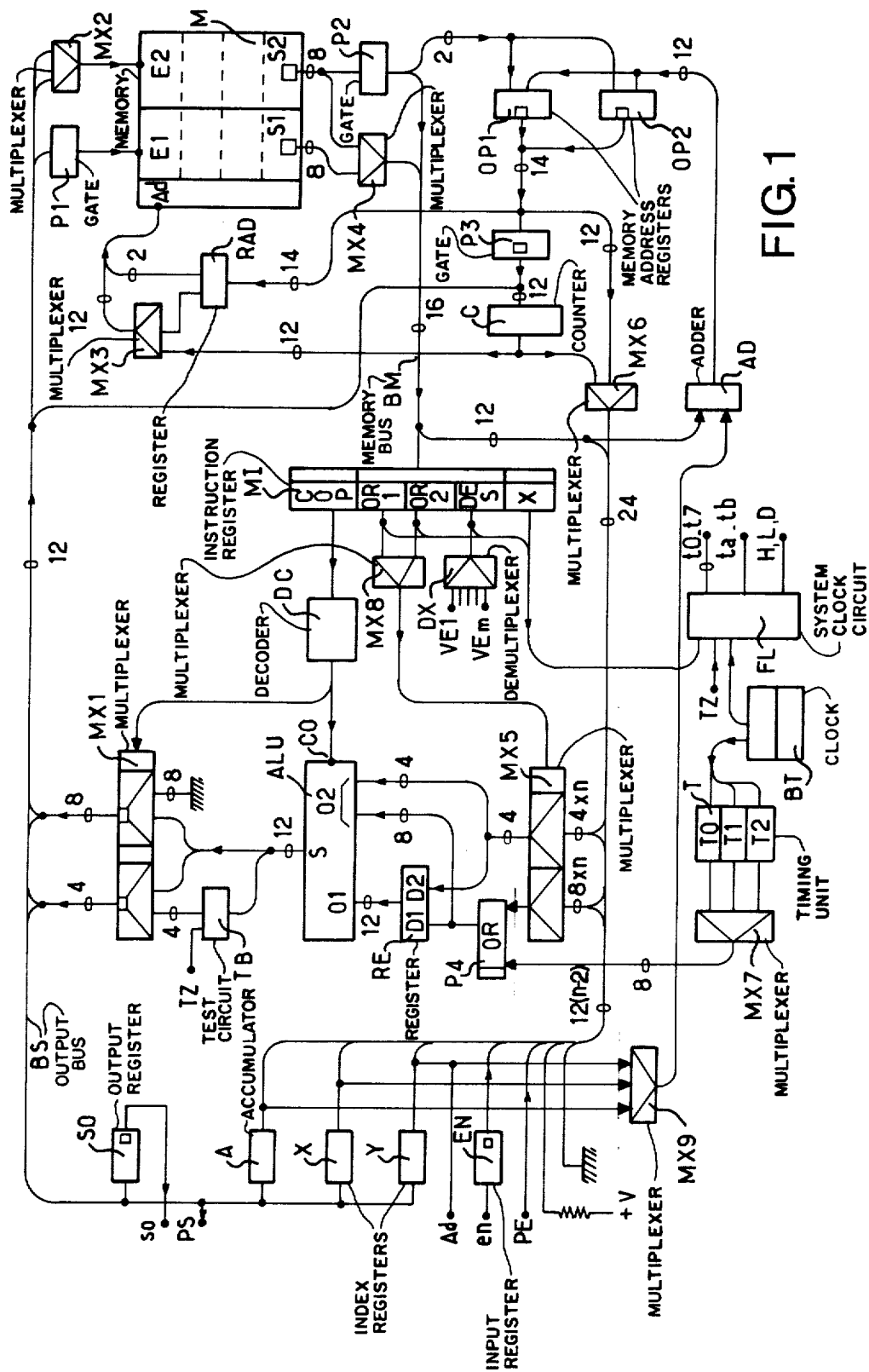
FIG. 1—is a block diagram of sequential logic according to the invention.

The arithmetic and logical processing unit ALU (FIG. 1) processes 12-bit words. It has two data inputs, 01-02, an output S, and an operation code input CO. Said processing unit ALU may be composed of three Standard TTL SL 74181 integrated circuit packages, which provide a capability of 16 logic and 16 arithmetical operations (including logical sum and product, with or without carry, substraction, and so forth). Details of the TTL SN74LS181 integrated circuit packages can be had by reference to *The TTL Data Book for Design Engineers* published by Texas Instruments in 1973.

An output bus BS gives access to destinations. The system has an input register EN, which has access to the inputs of the ALU and an output register SO, which has access only to the outputs of the ALU, and index registers or data registers X, Y, and an accumulator A, which have access to both inputs or outputs of the ALU. A memory M and its instruction counter C can also have access either to the inputs or the outputs.

Access to the output bus BS from the output S of the ALU is through a multiplexer MX1 which may be composed of standard TTL 74S257 circuits, with ternary outputs ("0" or "1" when enabled or a high impedance when not enabled), which provides access either directly from the 12-wire output S or indirectly via a binary test circuit TB, which has a 12-wire input connected to the output S and a 4-wire output completed by eight grounded wires delivering binary "0". The binary test circuit TB is a coding device stating the place of its most significant "0" input in binary code, and may be composed, for example, of two standard TTL 74148 circuits in parallel. An additional output TZ is marked if all 12 tested inputs are "1's".

The 12-wire bus is connected to the inputs of the output register SO, the accumulator A, the index registers X and Y, the counter C, a gate P1 and a multiplexer MX2 selectively provides the memory with either bits 0–7 or bits 8–11. The gate P1 provides the memory with bits 0–7, while the multiplexer MX2 access respective parts of the binary input locations of the memory M.

The memory M is modular and is composed of 4 blocks of 1024 words each. Each 16-bit word is separable in 2 separately addressable eight bit bytes, the blocks being composed of 16 packages of 1024 one-bit words. The output of each package can adopt a high impedance state. Ternary outputs are identified in FIG. 1 by small squares.

Addressing is 14-bit: bits 0 to 9 address the word in a block; bits 10–11 address the block; and bits 12–13 enable the word in first and second 8-bit bytes. The first 12 bits of the output of a third multiplexer MX3 are received at the addressing input Ad of the memory M.

During a phase for aquisition of data and instructions from the memory the third multiplexer MX3 is accessed by the instruction counter C, and in an execution phase, it is accessed by a 14-bit address register RAD, of which the last 2 outputs indicating the first or second 8-bit bytes are directy connected to the memory M.

A gate P2 and a fourth multiplexer MX4 at the memory output access a 16-wire memory bus BM, with the option of transferring the second byte of the memory word on the first or last 8 wires of the bus. The bus accesses an instruction register MI (16 bit) and a fifth multiplexer at the input MX5 of the ALU also accessing a first input of a memory address indexing adder AD (12-bit): the second 12-wire input of the adder AD, namely the index input, is connected to the output of a multiplexer MX9, which gives the index registers X, Y and the accumulator A access to the adder AD.

The adder AD is connected to two 14-bit registers OP1, OP2, capable of storing 2 memory addresses. Bits 0 to 11 are loaded into the registers by the adder, and bits 12 and 13 are added by the memory itself via gate P2.

The registers OP1 and OP2 have ternary 14 bit outputs which are connected in common to the inputs of:
the address register RAD (14 wires)
a gate P3 leading to the counter C (12 wires, 0 to 11)
a multiplexer MX6 (12 wires, 0 to 11) which has access to the multiplexer MX5 to feed the ALU either from the common output of the registers OP1 and OP2 or from the counter C.

Access to the ALU operates as follows:

The multiplexer MX5 has n 12-wire inputs, n being the number of its direct sources (A,X,Y,PE,BM,MX6). It is also in two parts, respectively handling bits 0–7 and 8–11. This arrangement makes it possible to separate 8 wires (corresponding to bits 0–7) as an output of multiplexer MX5 to provide one group of inputs to OR gate P4, the second group of inputs to this gate being the 8-bit output of a multiplexer MX7. Operand word 1 is stored in a register RE ahead of ALU input 01: bits 0–7 are received at an input D1 of the register RE via an OR gate P4, which accepts input either from the multiplexer MX7 or the 8-bit portion of the output of the multiplexer MX5. Bits 8–11 are received at an input D2 of the register RE. Operand word 2 is entered at ALU input O2 and is composed of bits 0–7 from gate 4, and 8–11 from the multiplexer MX5.

The operation code COP, contained in the instruction word loaded into the instruction register MI is sent to ALU inputs CO through a decoder DC, of which certain outputs also drive the multiplexer MX1 for result testing by the binary test circuit TB.

The multiplexer MX5 is driven from the instruction register MI via a multiplexer MX8, which successively accepts operand code 1 (OR1) and operand code 2 (OR2) contained in the instruction word.

The destination code (DES) contained in the instruction word enables writing in the destination unit, addressing of the latter being performed by a demultiplexer DX having outputs VE1 to VEm connected to the write enabling inputs of m destination units.

In the example described, the multiplexer MX7 is used to open access for clocking circuits T0, T1, T2, of a timing unit T driven by a clock BT.

Sequential execution of an instruction has a number of phases, t0–t7, of which some may be skipped, for example according to the number of memory words to be read, and, evidently, according to test results.

Figure 2:
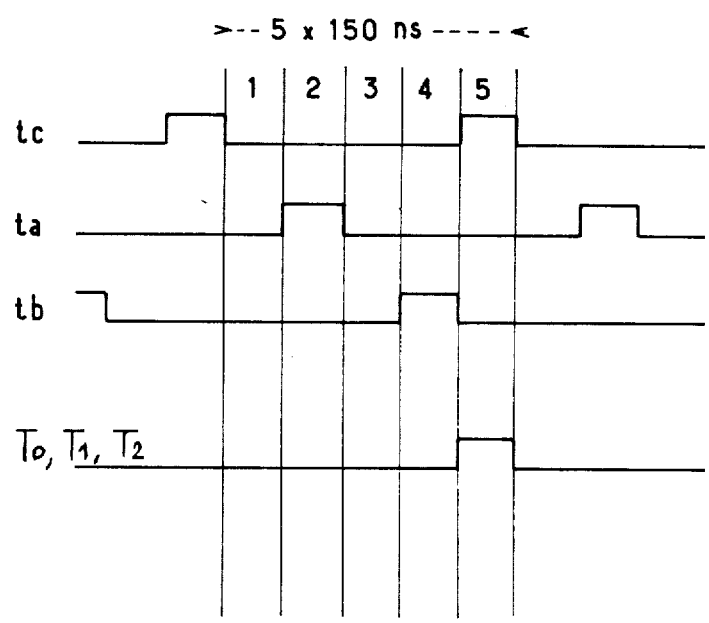
FIG. 2—shows output wave-forms of a system clock circuit.

Phases t0–t7 and intermediary active instants ta–tb (FIG. 2) are determined by a system clock circuit FL which groups a large number of logic functions for enabling the various gates, multiplexers and registers, at required instants. For destinations from the ALU, already enabled by DX, the system clock circuit FL supplies the logic state which triggers writing of the data ready in the ALU at a required instant.

Inputs to the system clock circuit FL are:
from clock BT: ta, tb, and tc
from the instruction word: operand codes, destination code, other data (X), such as the number of memory words to be read, result test, and break point address
from result test circuit TB:TZ.

Detailed description of the operation of the system clock circuit FL would not assist understanding the application described, so the system clock circuit FL, which does not possess any original features, will not be described. Its main functions will however be indicated in this description of the execution of an instruction.

Operation of the logic according to the invention is in two parts: initialization and execution.

Initialization is in four phases, t0–t3:

| Phase t0 | instant ta | read memory address Co contained |
| --- | --- | --- |
| | tb | in counter C |
| Phase t1 | instant ta | Load register MI |
| | tb | Step counter C (C = Co + 1) test number of words to be read, and skip to t4 if test = 1 |
| Phase t2 | instant ta | Load register OP1 |
| | tb | Step counter C C = Co + 2) Test number of words to be read, and skip to t4 if test = 2 |
| Phase t3 | instant ta | Load register OP2 |
| | tb | Step counter C (C = Co + 3) advance to execution |
| Execution comprises phases t4 to t7: | | |
| Phase t4 | instant ta | Test peripheral, for enabled input or ready output. If test negative, skip t0 |
| | tb | Load address register RAD from OP1, if the memory is either source or destination, unless: OR1 = a register in which OR2 = OP1 case, OP2 DES: memory loads into RAD |
| Phase t5 | instant ta | Open access for source OR1 |
| | tb | Load OR1 into input register RE |
| Phase t6 | instant ta | Open access for OR2 |
| | tb | Open access to destination Read test bit T (T = 0: skip to t0) (T = 1: proceed to t7) |
| Phase t7 | | Test 12 bits of result (circuit TB): if 1 output: "1" skip to t0; if all outputs = "0", load counter C from OP1 or OP2, according to the "1" or "0" break point address contained in register MI. |

The above sequence is steered by the logic functions contained in the system clock circuit FL as follows:

phase change orders: clock instants are supplied by BT (ta, tb and tc at the end of each clock period, to step a phase counter). Jumps are ordered according to the number of words to be read (phases t0 to t3) and according to test results;

control of circuits: at each phase, orders are delivered according to the codes received (sources, destination), or simply according to the phase (for example, enabling of gate P3 and multiplexer MX1 in phase t7).

It is understood that the invention is not restricted to the application described, which merely represents a particular organization and technology.

What we claim is:

1. A programmable sequential logic circuit for the processing of data according to a program containing instructions of different lengths each instruction composed of one or several instruction words, said sequential logic circuit comprising:

a memory containing instructions and data words,
an arithmetic and logical processing unit (ALU),
an instruction register for temporarily storing an instruction word from said memory,
a plurality of data registers and address registers,
an adder connected to index the contents of either of said address registers by adding the contents of one of said data registers to either of said address registers, a clock driving a system clock circuit which is additionly responsive to an operation code in driving said instruction register to control the operation of said sequential logic circuit, an input multiplexer through which access to said ALU is provided wherein inputs of said input multiplexer are connected to the outputs of said memory, the outputs of said data registers and the outputs of said address registers, an output bus, the output of said ALU being connected to said output bus via a circuit having outputs which adopt a high impedance state when they are not enabled, said output bus connecting elsewhere to the inputs of said memory and of said data registers, and wherein complete processing according to said instruction word temporarily stored in said instruction register is performed in a plurality of phases under the control of said system clock circuit, a first portion of said plurality of phases being devoted to the acquisition of one or several data or instruction words, and a second portion being devoted to the execution of an operation by said ALU according to an operation code contained in said instruction word stored in said instruction register.

2. A programmable sequential logic circuit according to claim 1, wherein said output circuit includes, a test circuit having outputs which adopt a high impedance state when they are not enabled, an output multiplexer, the output of which is connected to said output bus, wherein a first input of said output multiplexer is connected directly to the output of said ALU and a second input of said output multiplexer is connected to an output of said test circuit, the input of which is also connected to the output of said ALU.

3. A sequential logic circuit according to claim 2, in which said test circuit is a "one out of n" coder with inputs arranged according to a scale of priorities, and said test circuit has two outputs, a first output connected to the second input of said output multiplexer and stating the place of the highest priority input of the test circuit having a given logic level, and a second output connected to an input of said system circuit, said second output being enabled for certain values of the data received at the input of the test circuit to cause phase skipping of said system clock circuit.

4. A sequential logic circuit according to claim 3, further comprising an instruction counter containing the memory address of the next instruction word to be loaded in the instruction register, the input of said instruction counter being connected to said output bus and also to the output of said address registers via a gate, said gate being enabled by said system clock circuit according to a predetermined logic state of said second output of said test circuit, and the output of said instruction counter being connected to an address input of said memory and to another input of said input multiplexer.

5. A sequential logic circuit according to claim 1, in which said instruction register is divided into a plurality of parts, at least a part containing said operation code and connected to control said ALU, two parts each containing an operand code to control said input multiplexer, one part containing a destination code and connected to a demultiplexer the outputs of which are connected to enable a transfer of data via said output bus, and a further part containing the number of words of the instruction being processed.

6. A sequential logic circuit according to claim 1, in which the memory words are divided into two separately addressably parts, said memory having two inputs and two outputs corresponding to said parts of the memory words, wherein said inputs of said memory are connected through a first gate circuit to corresponding first and second parts of said output bus, and wherein said outputs of said memory are connected through a second gate circuit to corresponding parts of a memory bus, said first gate circuit including a multiplexer connected to switch said parts of the output bus to individual ones of said inputs of said memory, and second gate circuit including a multiplexer connected to switch said two outputs of said memory to one individual parts of said memory bus.

* * * * *